(12) United States Patent
Moran (10) Patent No.: US 6,324,537 B1
(45) Date of Patent: Nov. 27, 2001

(54) DEVICE, SYSTEM AND METHOD FOR DATA ACCESS CONTROL

(75) Inventor: Dov Moran, Kfar Saba (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 0 days.

(21) Appl. No.: 09/409,091

(22) Filed: Sep. 30, 1999

(51) Int. Cl.$^7$ ...................................................... G06F 17/30
(52) U.S. Cl. ........................... 707/9; 707/100; 707/200; 711/163; 711/164
(58) Field of Search ................................ 707/9, 100, 200; 711/163, 164

(56) References Cited

U.S. PATENT DOCUMENTS

| | | | |
|---|---|---|---|
| 4,135,240 | * | 1/1979 | Ritchie .................................. 711/164 |
| 4,506,329 | * | 3/1985 | Duwel et al. ......................... 705/410 |
| 4,590,552 | * | 5/1986 | Guttag et al. ......................... 711/163 |
| 4,884,211 | * | 11/1989 | Kishi et al. ............................ 700/180 |
| 4,954,982 | * | 9/1990 | Tateishi et al. ....................... 711/164 |
| 5,146,565 | * | 9/1992 | Blanck et al. ......................... 710/36 |
| 5,187,790 | * | 2/1993 | East et al. ............................. 709/316 |
| 5,500,517 | * | 3/1996 | Cagliostro ............................. 235/486 |
| 5,581,700 | * | 12/1996 | Witte ...................................... 713/202 |
| 5,724,578 | * | 3/1998 | Morinaga et al. ................... 707/100 |
| 5,936,221 | * | 8/1999 | Corder et al. ......................... 235/380 |
| 6,240,493 | * | 5/2001 | Hardwood, III et al. ........... 711/163 |

OTHER PUBLICATIONS

Anonymous, "SmartCards Hold Great Promise", Financial Times Surveys Edition, Feb. 5, 1997, p 6.*

* cited by examiner

Primary Examiner—Paul R. Lintz
(74) Attorney, Agent, or Firm—Mark M. Friedman (57) ABSTRACT

A device, a method and a system for providing control of access to data which is stored in an electronic data storage device. The device, method and system enable various types of permissions to be set for determining access to the stored data, such that if an attempt is made to access particular data which does not have a suitable permission type, access is denied. Preferably, the present invention is implemented as an access control device, such as a chip for example, which more preferably controls all access to the data storage device. This implementation is preferred, since such electronic devices are more difficult to "hack" for access by an unauthorized user. The device, system and method have a number of different utilizations, such as for controlling access to credit card information; for identifying a user according to a PIN or other identification information; for controlling access to a particular location according to the identity of the user; and for controlling access to various types of data files, such as music files in the MP3 format and so forth.

24 Claims, 2 Drawing Sheets

DEVICE, SYSTEM AND METHOD FOR DATA ACCESS CONTROL

FIELD AND BACKGROUND OF THE INVENTION

The present invention relates to a device, a system and method for data access control, particularly for controlling access to data stored on a data storage device, such that access is determined according to the mode of data storage.

Computers are useful for the storage, retrieval and manipulation of data. Currently, many different types of electronic data storage devices are used in conjunction with computers. These electronic storage devices may be located externally or internally to the computer with which the storage device is in communication. For example, a magnetic storage device, such as hard disk drive, could be located internally to the computer, in direct communication with the system bus of the computer and operated by the CPU (central processing unit) of the computer. Flash memory, which is both readable and writable, is a physically smaller storage device, which may be located within the physical case of the computer, and which is also connected to the system bus and operated by the CPU. Removable storage media may also be used to store data, in which a hardware device, or "drive", for reading from and/or writing to the storage medium, is connected to the system bus of the computer. Examples of removable storage media include, but are not limited to, optical disks, CD-ROM disks and floppy diskettes. At some level, all of these various hardware devices are in communication with the computer which operates the device, regardless of the location of the electronic storage device. Therefore, access to the data is provided through such a computer.

One important aspect of such data storage is that access to the data should be controlled, for the purpose of data security. Currently, most forms of data access control are implemented as software programs, which have a number of disadvantages. For example, these programs may be "hacked" or overcome by an unauthorized user, who can then gain access to the data. Such a disadvantage has become more acute with the advent of networks, distributed data storage and "client-server" applications, all of which increase the number of access points to the computer through which the electronic storage device is accessed, and hence to the stored data on that device. Such an increased number of access points also potentially increase the ability of an unauthorized user to access the data. Thus, software programs are clearly not adequate protection for data stored in a networked environment with multiple access points.

Another type of data access control is provided through the operating system of the computer itself. For example, UNIX and other operating systems typically allow an authorized user to determine the level of permissions associated with a particular file and/or sub-directory, which could be "read-only", "read/write" and so forth. Unfortunately, such permissions are often relatively simple, only differentiating between "read" and "write" for example. Also, like other types of software programs, these operating systems may be "hacked" by an unauthorized user, who can then gain access to the data.

In addition, if the electronic hardware storage device itself is stolen, then typically the data becomes completely unprotected, such that any unauthorized user can easily gain access to the data on the storage device. Neither software programs nor the operating system of the computer can overcome this problem, since they are stored and implemented separately from the storage device itself.

A more useful solution would be implemented with the hardware of the electronic storage device in a more integrated manner, such that even if the storage device itself is stolen, the data could not be easily accessed. Furthermore, such integration would increase the difficulty of access by an unauthorized user. Unfortunately, such a solution is not currently available.

There is thus an unmet need for, and it would be useful to have, a device, a system and a method for controlling access to data stored on an electronic storage device, which does not rely on separately stored software programs, which is optionally integrated with the hardware of the storage device, and which is significantly resistant to access by an unauthorized user, even if the electronic data storage device is removed by an unauthorized user for such unauthorized access.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The present invention is of a device, a method and a system for providing control of access to data which is stored in an electronic data storage device. The present invention enables various types of permissions to be set for determining access to the stored data, such that if an attempt is made to access particular data which does not have a suitable permission type, access is denied. Preferably, the present invention is implemented as an access control device, such as a chip for example, which more preferably controls all access to the data storage device. This implementation is preferred, since such electronic devices are more difficult to "hack" for access by an unauthorized user. The present invention has a number of different utilizations, such as for controlling access to credit card information; for identifying a user according to a PIN or other identification information; for controlling access to a particular location according to the identity of the user; and for controlling access to various types of data files, such as music files in the MP3 format and so forth. Thus, the present invention provides a more secure solution for the controlling access to data, which is useful for substantially any type of data storage device.

The device of the present invention may be implemented in a number of different ways, all of which are considered to be within the scope of the present invention, including but not limited to, both removable and permanent storage devices; devices connected to a computer through a USB bus, or alternatively through any other suitable hardware connection interface; a single chip with a microprocessor and firmware for operating the data access features, or alternatively may be implemented as data storage with logic only, and so forth. The important feature of the present invention is that it enables a plurality of different types of data access to be combined in a single storage device. The device of the present invention is flexible and is able to store data according to several different access types within a single device. Furthermore, the present invention may optionally determine the type of data access according to information which is appended to the stored data, such that the type of data access is defined according to a "soft", data-based definition, rather than according to a "hard" definition which is implemented only in the hardware itself.

According to the present invention, there is provided a system for controlling access to stored data, the system comprising: (a) an electronic data storage device for storing the stored data; and (b) an access control device for controlling access to said electronic data storage device, such that the stored data is only accessed through said access control device, and such that said access control device determines access to the stored data according to at least one permission.

The electronic data storage device and the access control device may optionally be implemented as a single chip, or alternatively may be embodied in two separate functional components, for example.

According to another embodiment of the present invention, there is provided a device for controlling access to data stored in an electronic data storage device, the device comprising: (a) an input for receiving a request to access the stored data; (b) a non-volatile memory for storing at least one permission for determining access to the stored data; (c) at least one instruction for determining a permitted access according to the at least one permission, said at least one instruction being stored on said non-volatile memory; and (d) a processor for executing said at least one instruction and for comparing said request to said at least one permission, such that if said at least one permission includes a type of access requested in said request, the stored data is provided, and alternatively if said at least one permission does not include a type of access requested in said request, the stored data is not provided.

According to yet another embodiment of the present invention, there is provided a method for controlling access to data stored in an electronic data storage device, the method comprising the steps of: (a) providing an access control device for determining access to the electronic data storage device; (b) receiving a request to access the stored data by said access control device; (c) comparing said request to at least one permission for determining access to the stored data by said access control device; (d) if said at least one permission includes a type of access requested in said request, performing said request for accessing the stored data from the electronic data storage device by said access control device; and (e) alternatively, if said at least one permission does not include said type of access requested in said request, rejecting said request by said access control device.

Hereinafter, the terms "computer user" and "user" both refer to the person who operates a computer which is in communication with a data storage device.

Hereinafter, the term "computer" refers to a combination of a particular computer hardware system and a particular software operating system. Examples of such hardware systems include those with any type of suitable data processor. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Corp. (USA).

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware, or a combination thereof.

DETAILED DESCRIPTION OF THE INVENTION

The present invention is of a device, a method and a system for providing control of access to data which is stored in an electronic data storage device. The present invention enables various types of permissions to be set for determining access to the stored data, such that if an attempt is made to access particular data which does not have a suitable permission type, access is denied. Preferably, the present invention is implemented as an access control device, such as a chip for example, which more preferably controls all access to the data storage device. This implementation is preferred, since such electronic devices are more difficult to "hack" for access by an unauthorized user. The present invention has a number of different utilizations, such as for control of access to credit card information; for identifying a user according to a PIN or other identification information; for controlling access to a particular location according to the identity of the user; and for controlling access to various types of data files, such as music files in the MP3 format and so forth. Thus, the present invention provides a more secure solution for the control of access to data, which is useful for substantially any type of data storage device.

The device of the present invention may be implemented in a number of different ways, all of which are considered to be within the scope of the present invention. For example, the device of the present invention may be implemented as a removable device for temporary connection to a computer, or alternatively may be implemented as a permanent storage device. The device may optionally be connected through a USB bus, or alternatively through any other suitable hardware connection interface, for example. As another option, the device may feature a single chip with a microprocessor and firmware for operating the data access features, or alternatively may be implemented as data storage with logic only. For the latter implementation, the device is preferably connected to a computer which operates software for interacting with the logic of the device, and hence for performing the data access method of the present invention. Alternatively, the device may be composed of a plurality of separate functional units which are not combined in a single chip.

Regardless of the type of implementation of the device of the present invention, the important feature of the present invention is that it enables a plurality of different types of data access to be combined in a single storage device. Unlike background art storage devices which are generally restricted to a single type of data access in terms of the hardware implementation, the present invention is flexible and is able to store data according to several different access types within a single device. Furthermore, the present invention may optionally determine the type of data access according to information which is appended to the stored data, such that the type of data access is defined according to a "soft", data-based definition, rather than according to a "hard" definition which is implemented only in the hardware itself.

The principles and operation of a device, a system and a method according to the present invention may be better understood with reference to the drawings and the accompanying description, it being understood that these drawings are given for illustrative purposes only and are not meant to be limiting. Furthermore, although the following discussion centers upon a removable device which is preferably connected to a USB bus, it is understood that this is for the purposes of description only and is not intended to be limiting in any way.

Figure 1:
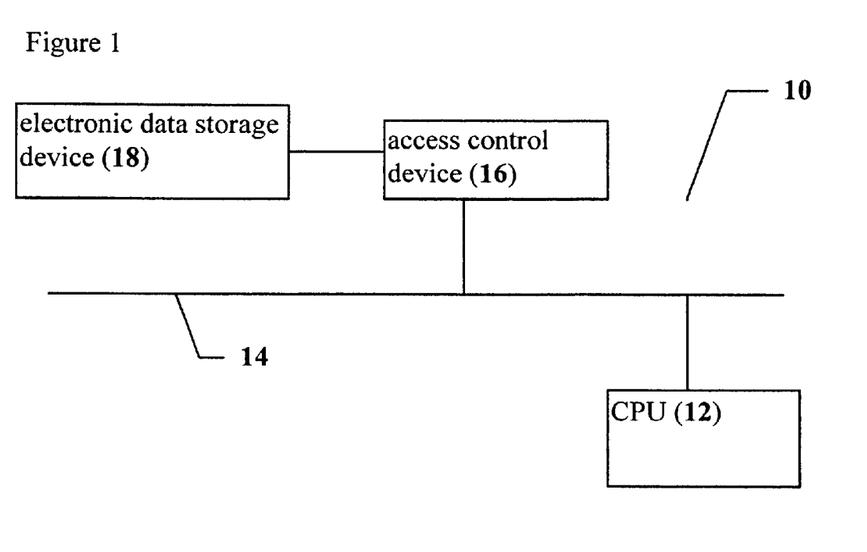
FIG. 1 is a schematic block diagram of an exemplary system according to the present invention.

Referring now to the drawings, FIG. 1 is a schematic block diagram of an illustrative, exemplary system according to the present invention for controlling data access. A system 10 features a CPU 12 for executing instructions, such as a request to read data for example. CPU 12 is connected to a bus 14. An access control device 16 is also connected to bus 14, such that access control device 16 is in communication with CPU 12 through bus 14. Bus 14 is preferably a USB (universal serial bus), although of course bus 14 may alternatively be implemented as any other suitable type of bus connection.

A data storage device 18 is in communication with access control device 16, such that any attempts to access data in data storage device 18 must pass through access control device 16. Preferably, as shown, data storage device 18 is not in direct communication with bus 14. Therefore, if CPU 12 receives an instruction to read data from data storage device 18, CPU 12 preferably cannot directly read such data by sending a command through bus 14 directly to data storage device 18. Rather, preferably CPU 12 must send the command to access control device 16, which then determines if such access should be granted and the data read from data storage device 18. Thus, more preferably, data can only be read from, and written to, data storage device 18 through access control device 16.

Access control device 16 is optionally implemented according to a plurality of different embodiments, at least partially determined by the particular type of data storage device 18. For example, access control device 16 could optionally be implemented as a chip, with a non-volatile memory which is both readable and writable, such as a flash memory device for example, some type of input for receiving a request for data, and a microprocessor. As described in greater detail below, the various types of permissions could optionally be stored on the non-volatile memory, along with a set of instructions operated by the microprocessor. The chip could also be implemented as a programmable ASIC.

When access control device 16 receives a request for particular data which is stored in data storage device 18, the stored instructions are executed by the microprocessor in order to compare the request for the data to the stored permissions. If the stored permissions are such that the data request may be fulfilled, as described in greater detail below, then access control device 16 enables data to be retrieved from data storage device 18. Otherwise, access control device 16 does not enable the data to be retrieved. Since preferably data storage device 18 can only be accessed through access control device 16, if such access is not granted by access control device 16, then the data cannot otherwise be retrieved.

Access control device 16 could also optionally be directly integrated into data storage device 18. For example, if data storage device 18 is a flash memory device, which is typically embodied as a chip, then the functions of access control device 16 could be integrated into the chip itself. For example, data storage device 18 could be incorporated into a single chip with a microprocessor for access control device 16, and firmware for operating the data access features. Alternatively, access control device 16 may optionally only feature logic, such that access control device 16 would interact with CPU 12 for operating software for interacting with the logic, and hence for performing the data access method of the present invention. Alternatively, access control device 16 and data storage device 18 may be implemented as a plurality of separate functional units which are not combined in a single chip.

However, the implementation of access control device 16 as a chip, or other electronic device, whether integrated into, or separate from, data storage device 18, is particularly preferred since such an implementation also enables the security of access control device 16 to be more easily maintained, as electronic hardware devices are more difficult to "hack" for unauthorized access. As described above, access control device 16 is preferably implemented as firmware, which combines software instructions stored on a hardware memory, with additional hardware components such as a microprocessor for performing the instructions.

According to preferred embodiments of the present invention, system 10 enables a plurality of different types of permissions for accessing data to be stored by access control device 16, such that a variety of different types of data access can be provided. As an example, one type of permission could be a standard read and write permission, but with write protection, such that access control device 16 would permit data to be read from data storage device 18, but would block an attempt to write data to data storage device 18. If such a permission is to be stored in an abbreviated code, the code for this particular type of permission could be given as "R/W/WP", for example. Such a code could optionally be stored in the non-volatile memory of access control device 16, for example. However, the permission is such that it could be changed to permit such write access, or a read and write permission with no write protection, with a code as follows: R/W/NP. These standard types of read and write permissions are often used for hard disks, floppy diskettes and other storage media, for example.

The present invention also preferably enables more complex types of permissions to be implemented. For example, the permission could be given as "write once and read many times", or "WO/RM" in code form, such that the data could only be written to data storage device 18 once, but could be read from data storage device 18 many times. One example of a useful implementation of such a permission is the storage of a picture for identifying a user, for example in order to permit access to a particular location.

Another type of optional but preferred implementation of a permission is "write once, no read, comparison with yes/no answer only", or "WO/NR/C" in code form. This type of permission indicates that the data can only be written to data storage device 18 once and cannot be read from data storage device 18. However, access control device 16 can enable the data to be compared with received data, but would only provide information in the form of a "yes" or "no" answer as a result of the comparison. One example of a useful implementation of such a permission is for a PIN (personal identification number) or other number for identifying a user, such as for accessing a bank account or using a credit card. Access control device 16 can receive data in the form of the PIN or other information entered by the user, and can then compare the received data to data which is stored in data storage device 18. Access control device 16 would then confirm whether the correct PIN or other identification information had been entered by returning a positive or negative comparison. The stored data would not be released from data storage device 18, such that the PIN could not be read from data storage device 18 by an unauthorized user. Thus, data security would be maintained, while still enabling the identity of the user to be confirmed according to an entered PIN or other identification information.

One variation of this type of permission incorporates permission, or lack thereof, for updating the stored data. With regard to the example above, the PIN or other identification information could optionally be changed for updating, if the permission is given as updatable, or WO/NR/C/U in code form. Alternatively, if the permission is given such that the data cannot be updated, or WO/NR/C/U in code form, then the data cannot be altered.

A more specific example of these different types of permissions, and their use thereof, is given below with regard to FIG. 2, which features a flowchart of an illustrative and exemplary method according to the present invention for controlling data access.

Figure 2:
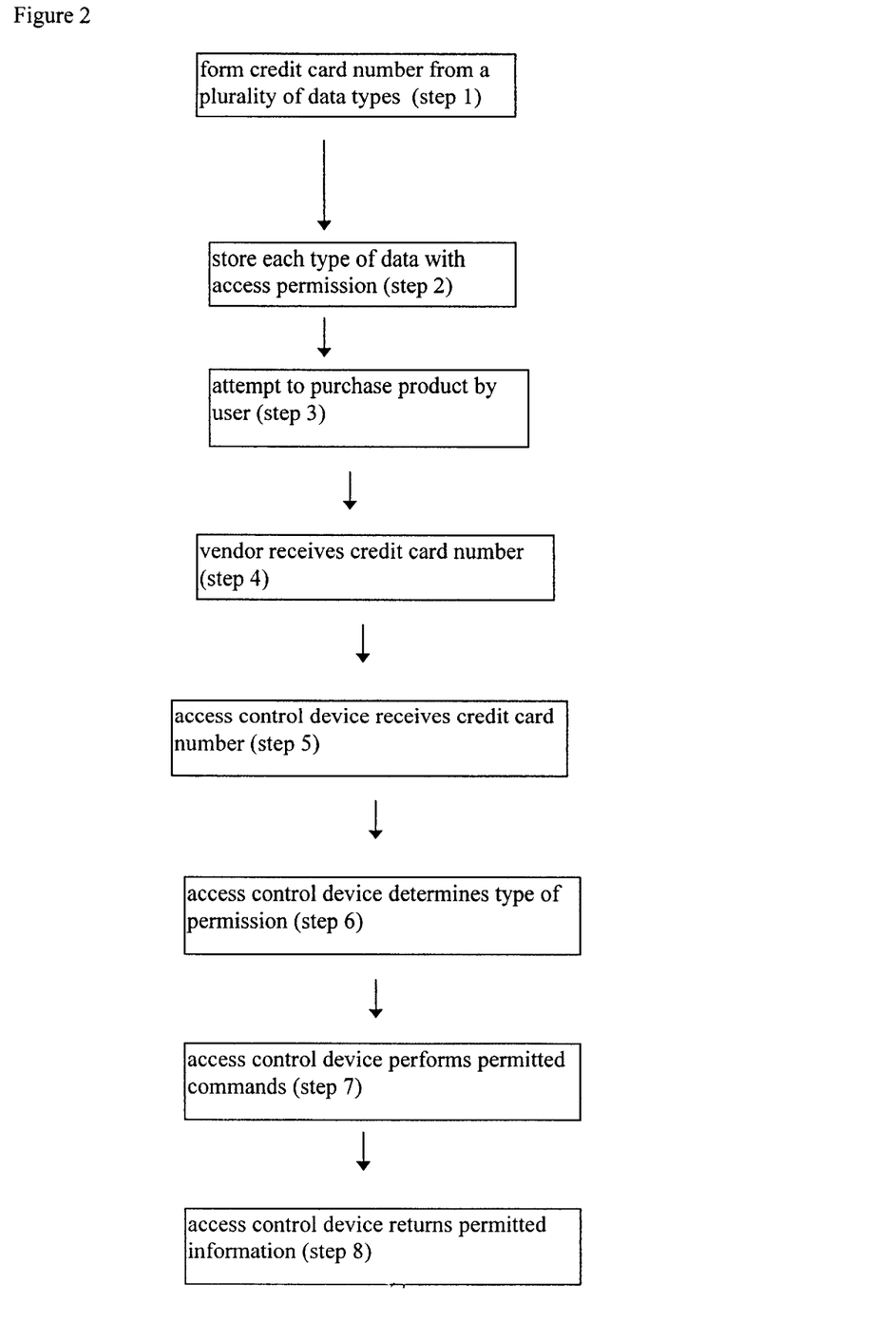
FIG. 2 shows a flowchart of an example of a method according to the present invention.

FIG. 2 shows a flowchart of an example of a method according to the present invention, with regard to access to data in the form of a stored credit card number. In step 1, a plurality of different types of information are combined to form the credit card number. Preferably, the format of the credit card number is given as follows:YYYZZZDDDAAA, in which YYY is a code which identifies the originator of the credit card data, such as the provider of the credit card; ZZZ is an identification number for the credit card account, which currently forms the credit card number in background art implementations of a credit card; DDD, which optionally features other data about the credit card account, such as the date when the credit card was issued, where the credit card was issued, the expiration date and so forth; and AAA, which optionally and preferably is a PIN as previously described.

In step 2, each portion of the credit card number is stored with a separately selected and assigned data access permission, which optionally and preferably is different for each portion of the number. For example, preferably "YYY", "ZZZ" and "DDD" are each stored with the permission assigned as WO/RM (write once, read many times); AAA is preferably stored with the permission assigned as WO/NR/C/U (write once, do not read, compare only, updatable). These permissions are described in greater detail above.

In step 3, the user attempts to purchase a product with the credit card number. In step 4, the merchant or other party receiving the payment enters the credit card number. It should be noted that this step is optionally performed substantially automatically, for example for e-commerce through a Web site. In step 5, the access control device receives the credit card number.

In step 6, the access control device determines the type of permission for each portion of the credit card number. In step 7, the access control device performs the commands which are permitted, optionally including reading the portions of the credit card number which are designated as "YYY", "ZZZ" and "DDD", and performing a comparison with the portion of the credit card number which is designated as "AAA". In step 8, the permitted information is returned by the access control device. Thus, this illustrative method is an example of the utility of the present invention for validating a credit card number for performing a purchase.

Other types of data which could be stored with an assigned type of permission according to the present invention include, but are not limited to, an access control code, an identification code and various types of data files, as described in greater detail below.

For example, an access control code could be implemented with a combination of different types of data, each of which could again feature a separately selected and assigned data access permission, which optionally and preferably is different for each portion of the data. If the access control code is implemented as a number, then preferably these different types of data are as follows, with the data access permissions. The first portion of the access control code is optionally a code which identifies the data as an access control code, and which is preferably stored as "WO/RM". The second portion of the access control code is preferably the access code itself, and is preferably stored as "WO/NR/C/U".

Similarly, an identification code is optionally and preferably composed of a first portion which identifies the data as an identification code, and which is preferably stored as "WO/RM", and a second portion which is the unique identification code, for example for a hardware device, which is preferably stored as "WO/RM".

Other types of data files may be stored with associated permission types as desired, which are constructed as previously described. For example, most data files are preferably stored as "R/W" data, with the decision to permit writing to the data ("R/W/WP") or not to permit such writing ("R/W/NP"), decided according to user preference. Thus, the present invention can accommodate many different types of uses for the control of data access.

According to another optional embodiment of the present invention, data could be stored on the storage device according to a data access type which may be defined as "read a few times, then delete". According to this preferred type of data access, a file would be stored on the device of the present invention and could then be read only a predefined number of times, which preferably would be a plurality of different read times. After the data had been read the predefined number of times, the device of the present invention would then delete the data, or otherwise render the data inaccessible for an additional data read. This type of data access is preferred for file types such as MP3 music files, which may be provided by a vendor for only such a predefined number of data read accesses, for example in order to prevent the unauthorized redistribution of such files.

It will be appreciated that the above descriptions are intended only to serve as examples, and that many other embodiments are possible within the spirit and the scope of the present invention.

What is claimed is:

1. A system for controlling access to stored data, the stored data having at least one associated type of permission, the system comprising:

(a) an electronic data storage device for storing the stored data; and (b) an access control device for controlling access in said electronic data storage device according to a type of requested access, wherein said access control device has a plurality of different types of access for accessing data on said electronic data storage device, such that the stored data is only accessed through said access control device, and such that said access control device determines access to the stored data by comparing the at least one associated type of permission to said type of access being requested.

2. The system of claim 1, wherein said electronic data storage device and said access control device are implemented on a single chip.

3. The system of claim 2, wherein said access control device includes a microprocessor and firmware for storing a plurality of instructions, such that said access control device determines said access according to said instructions of said firmware.

4. The system of claim 2, wherein said access control device is only logic, the system further comprising:
   (c) a software program for containing a plurality of instructions for determining said access to said data storage device; and
   (d) a data processor for operating said software program.

5. The system of claim 4, wherein said data storage device and said access control device are contained on said chip, and wherein said chip is included in a removable device.

6. The system of claim 1, wherein said data storage device and said access control device are implemented as a plurality of separate components.

7. The system of claim 1, wherein said access control device is implemented as a programmable ASIC.

8. The system of claim 1, wherein said access control device further comprises:
   (i) an input for receiving a request to access the stored data;
   (ii) a non-volatile memory for storing at least one permission for determining access to the stored data;
   (iii) at least one instruction for determining a permitted access according to the at least one permission, said at least one instruction being stored on said non-volatile memory; and
   (iv) a processor for executing said at least one instruction and for comparing said request to said at least one permission, such that if said at least one permission includes a type of access requested in said request, the stored data is provided, and alternatively if said at least one permission does not include a type of access requested in said request, the stored data is not provided.

9. The system of claim 8, wherein said non-volatile memory is a flash memory device.

10. The system of claim 9, further comprising:
    (c) a CPU (central processing unit) for transmitting said request to said access control device and for receiving provided data; and
    (d) a bus for connecting said CPU to said access control device, such that said electronic data storage device is not accessed through said CPU, but only through said access control device.

11. The system of claim 10, wherein said bus is a USB (universal serial bus).

12. The system of claim 11, wherein said at least one permission is for comparing said request to the stored data and for returning a positive or negative comparison, such that if said request is identical to the stored data, said comparison is positive, and alternatively such that if said request is not identical to the stored data, said comparison is negative, and such that the stored data is not read.

13. The system of claim 1, wherein said access control device is integrated with said electronic data storage device.

14. A method for controlling access to data stored in an electronic storage device, the method comprising the steps of:
    (a) providing an access control device for determining access to the electronic data storage device;
    (b) receiving a request to access the stored data by said access control device;
    (c) comparing said request to at least one permission for determining access to the stored data by said access control device, wherein said at least one permission is one of a plurality of different types of permission, each type of permission determining a type of success to the stored data;
    (d) if said at least one permission includes a type of access requested in said request, performing said request for accessing the stored data from the electronic data storage device by said access control device; and
    (e) alternatively, if said at least one permission does not include a type of access requested in said request, rejecting said request by said access control device.

15. The method of claim 14, wherein said type of access includes permission to read from the stored data, such that step (d) includes the step of reading from the stored data.

16. The method of claim 14, wherein said type of access includes permission to write to the stored data, such that step (d) includes the step of writing to the stored data.

17. The method of claim 14, wherein said type of access only includes comparing said request to the stored data and for returning a positive or negative comparison, such that if said request is identical to the stored data, step (d) includes the step of returning a positive comparison, and alternatively such that if said request is not identical to the stored data, step (d) includes the step of returning a negative comparison, such that the stored data is not read.

18. The method of claim 14, wherein the stored data is a credit card number, and said credit card number features a plurality of types of data, each of said plurality of types of data being stored with a separately selected access permission.

19. The method of claim 14, wherein the stored data has a permission for a predetermined number of data read accesses, such that step (c) includes the steps of:
    (i) determining a number of performed data read accesses for the stored data; and
    (ii) if said number of performed data read accesses is less than said predetermined number of data read accesses, permitting the stored data to be read.

20. A system for controlling access to stored data, the system comprising:
    (a) an electronic data storage device for storing the stored data, the stored data having at least one associated type of permission, said at least one associated type of permission being determined according to a data-based definition; and
    (b) an access control device for controlling access to said electronic data storage device according to a type of requested access, said access control device comprising hardware, such that said at least one associated type of permission is not determined by said hardware of said access control device, said access control device having a plurality of different types of access for accessing data on said electronic data storage device, such that stored data is only accessed through said access control device, and such that said access control device determines access to said stored data by comparing said at least one associated type of permission to said type of access being requested.

21. A system for controlling access to stored data, the system consisting essentially of:
(a) an electronic data storage device for storing the stored data; and
(b) an access control device for controlling access to said electronic data storage device, such that the stored data is only accessed through said access control device, and such that said access control device determines access to the stored data according to at least one permission.

22. A system for controlling access to stored data, the system comprising:

(a) an electronic data storage device for storing the stored data, said electronic data storage device having a single input for accessing the stored data, such that the stored data is only accessed through said single input; and
(b) an access control device for controlling access to said electronic data storage device through said single input, such that the stored data is only accessed through said access control device, and such that said access control device determines access to the stored data according to at least one permission.

23. The system of claim 22, wherein said at least one associated type of permission is determined according to a type of data being stored.

24. The method of claim 14, wherein said access control device has a single input and wherein a success is determined only through said single input.

* * * * *

UNITED STATES PATENT AND TRADEMARK OFFICE
CERTIFICATE OF CORRECTION

PATENT NO. : 6,324,537 B1
DATED : November 27, 2001
INVENTOR(S) : Moran

It is certified that error appears in the above-identified patent and that said Letters Patent is hereby corrected as shown below:

Please insert the following claims:

1. A system for controlling access to stored data, the stored data having at least one associated type of permission, the system comprising:
(a) an electronic data storage device for storing the stored data and information appended to the stored data, said appended information featuring said at least one associated type of permission for accessing the stored data; and
(b) an access control device for controlling access to said electronic data storage device, such that the stored data is only accessed through said access control device, and such that said access control device determines access to the stored data according to at least one said associated type of permission.

17. A method for controlling access to data stored in an electronic storage device, the method comprising the steps of:
(a) providing an access control device for determining access to the electronic data storage device, wherein such a provision further comprises the step of storing a plurality of different portions of data, each said portion of data having a separate data access permission;
(b) receiving a request to access the stored data by said access control device;
(c) comparing said request to at least one said data access permission for determining access to the stored data by said access control device, wherein said at least one data access permission is one of a plurality of different types of permission, each type of permission determining a type of access to the stored data;
(d) if said at least one data access permission includes a type of access requested in said request, performing said request for accessing the stored data from the electronic data storage device by said access control device; and
(e) alternatively, if said at least one data access permission does not include a type of access requested in said request, rejecting said request by said access control device.

21. A system for controlling access to stored data, the system consisting essentially of:
(a) an electronic data storage device for storing the stored data; and
(b) an access control device for controlling access to said electronic data storage device, such that the stored data is only accessed through said access control device, and such that said access control device determines access to the stored data according to at least one associated type of permission.

UNITED STATES PATENT AND TRADEMARK OFFICE
CERTIFICATE OF CORRECTION

PATENT NO. : 6,324,537 B1
DATED : November 27, 2001
INVENTOR(S) : Moran

It is certified that error appears in the above-identified patent and that said Letters Patent is hereby corrected as shown below:

22. A system for controlling access to stored data, the system comprising:
(a)  an electronic data storage device for storing the stored data, said electronic data storage device having a single input for accessing the stored data, such that the stored data is only accessed through said single input; and
(b)  an access control device for controlling access to said electronic data storage device through said single input, such that the stored data is only accessed through said access control device, and such that said access control device determines access to the stored data according to at least one associated type of permission.

23. The system of claim 1, wherein said at least one associated type of permission is determined according to a type of data being stored.

Signed and Sealed this

Fourteenth Day of May, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,324,537 B1 Page 1 of 1
DATED : November 27, 2001
INVENTOR(S) : Moran It is certified that error appears in the above-identified patent and that said Letters Patent is hereby corrected as shown below:

Please amend as follows:
The claim identified as number "17" on page 1 of Certificate of Correction issued on May 14, 2002 should be claim number "14"

Signed and Sealed this

Twenty-fifth Day of March, 2003

JAMES E. ROGAN
*Director of the United States Patent and Trademark Office*